United States Patent

[11] 3,600,073

| [72] | Inventor | William Chester Shaw<br>Streetsville, Ontario, Canada |
|---|---|---|
| [21] | Appl. No. | 879,464 |
| [22] | Filed | Nov. 24, 1969 |
| [45] | Patented | Aug. 17, 1971 |
| [73] | Assignee | Multiscreen Corporation Limited<br>Galt, Ontario, Canada |

[54] ROLLING LOOP FILM TRANSPORT MECHANISM
25 Claims, 23 Drawing Figs.
[52] U.S. Cl. .................................................. 352/184,
226/55, 226/95, 226/97, 226/113, 226/155
[51] Int. Cl. .................................................. G03b 1/20
[50] Field of Search .................................................. 226/2, 55,
59, 95, 97, 113, 152, 155, 156; 352/184

[56] References Cited
UNITED STATES PATENTS
3,214,233 10/1965 Persidsky ..................... 352/184
3,494,524 2/1970 Jones ............................ 226/113 X Primary Examiner—Richard A. Schacher
Attorney—Rogers, Bereskin and Parr ABSTRACT: A rolling loop mechanism for transporting photographic film through a motion picture apparatus. The mechanism includes a rotor having gaps for receiving and forming loops to transport the film, and a stator which guides the film between a film inlet and a film outlet. Fixed locating pins are provided for locating the film relative to an aperture and a decelerating mechanism is adapted to engage and decelerate the film to locate the film on the fixed pins. Each gap in the rotor is fed from a pressurized gas source for cushioning the blow caused by the rotor striking a growing loop as the film is fed in from the inlet.

PATENTED AUG 17 1971 3,600,073

INVENTOR.
WILLIAM CHESTER SHAW
BY
Rogers, Bereskin, & Parr

INVENTOR.
WILLIAM CHESTER SHAW
BY
Rogers, Bereskin, & Parr

INVENTOR.
WILLIAM CHESTER SHAW

FIG. 17

ROLLING LOOP FILM TRANSPORT MECHANISM

This invention relates to a mechanism for transporting photographic film through a projector, camera or other motion picture apparatus, particularly apparatus for use with large format film.

Professional motion picture projectors usually project each frame twice and 24 frames are transported per second. The time available for transporting one frame length is therefore of the order of one one-hundredth of a second. The short time available to transport each frame has been the main factor in limiting the size of frame used in motion picture film. U.S. Pat. No. 3,494,524 of P.R.W. Jones discloses a motion picture apparatus which has become known as a "rolling loop" mechanism. The Jones mechanism offers a number of advantages particularly in the case of projectors for use with large format film. One embodiment of the Jones mechanism includes a rotor having gaps and a curved stator for guiding the film between the rotor and the stator. Loops of film are formed in the moving gaps and these loops move the film one frame length each time the loop passes a stationary locating pin on the stator. The loop is developed continuously in a rotor gap by a driven input sprocket as the gap travels from a film inlet to a projection aperture, and the loop decays continuously as it travels from the aperture to a driven output sprocket. The stationary pin is located adjacent the aperture for locating the film during exposure or projection. The present invention contains a number of improvements over the original Jones mechanism and is capable of transporting large format film.

According to a preferred embodiment of the invention, a rolling loop mechanism is provided which includes a rotor having gaps for receiving and forming loops to transport a film, and a stator which guides the film between a film inlet and a film outlet. Fixed locating pins are provided for locating the film during exposure or projection and a decelerating cam mechanism is provided for engaging and decelerating the film to locate the film on the fixed pins. Each gap in the rotor is fed from a pressurized gas source for cushioning the blow caused by the rotor striking a growing loop as the film is fed in from the inlet.

Figure 5:
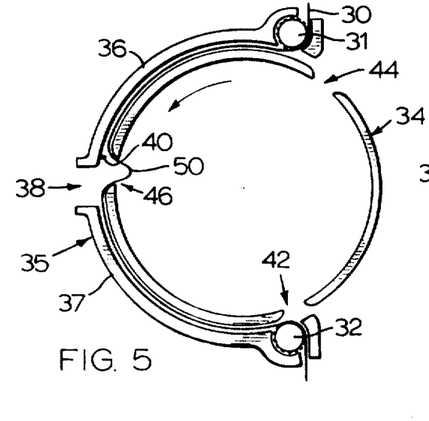
Figure 6:
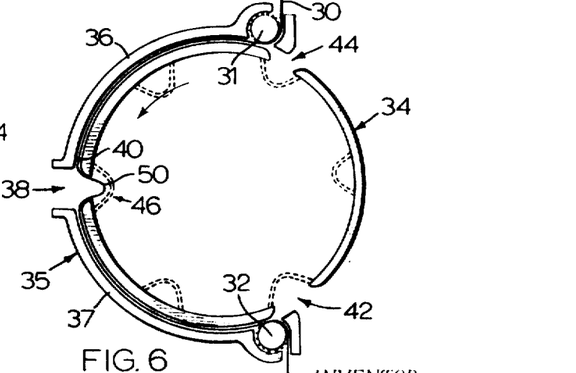

Reference is first made to FIGS. 1 to 6 to describe the principle of operation of a rolling loop film transport mechanism similar to that described by Jones in the aforementioned copending application. A film 30 is fed into the mechanism at a predetermined rate by a driven inlet sprocket 31 and is drawn from the mechanism by a driven outlet sprocket 32 at the same predetermined rate. An annular rotor 34 is driven at constant speed inside a stator 35 which includes an inlet portion 36 and an outlet portion 37. The portion 36 and 37 are fixed to the mechanism about a projection aperture 38 with sufficient radial clearance from the rotor 34 for the film 30 to move freely. During projection, the film 30 is located by a fixed pin 40 which is attached to the inlet stator 36 adjacent the aperture 38. The rotor has three equally spaced peripheral gaps 42, 44, 46 in which film loops are formed and moved around the stator 35 by the rotor 34. In the position shown in FIG. 1, a loop 48 in the film 30 is located in the opening 42 opposite the exposure aperture 38. The film is located on the pin 40 so that the portion of the film between the pin 40 and the inlet sprocket 31 is stationary. As the rotor 34 turns, and the sprockets 31 and 32 continue to transport the film 30, the mechanism moves into the position shown in FIG. 2 in which the loop 48 has decayed somewhat and a new loop 50 is being formed in the opening 46. The film is stationary between the openings 42 and 46 and projection is taking place at this time. As the inlet sprocket 31 continues to feed film into the mechanism, the loop 50 grows to take up the excess film. Also, the outlet sprocket 32 continues to draw film out of the mechanism, the loop 48 decays as the sprocket 32 transports the film. The rotor 34 continues to move and next reaches the position shown in FIG. 3 where the loop 50 is continuing to grow and the loop 48 is decaying. As the loop 50 begins to pass over the pin 40, the film is lifted off the pin 40 so that the film between the loop 50 and outlet sprocket 32 is free to move. The trailing side of the loop 50 then moves over the pin 40, as shown in FIGS. 5 and 6 whereupon the film is again located on the pin 40 and the part of the film between loop 50 and inlet sprocket 30 is stopped. The opening 46 is then opposite the projection aperture 38. The excess film in each full loop corresponds to a frame length so that in moving the film off the pin 40 and then reengaging the pin 40, the film is transported through one frame length. Consequently, the position shown in FIG. 6 is similar to that shown in FIG. 1 but with the film transported through one frame length and the rotor moved through one-third of a revolution to bring the gap 46 opposite the aperture 38.

If the mechanism is to be used in a projector, shutters for interrupting illumination at the required frequency can be provided by simply adding covers over each gap to form primary shutters and by placing similar covers midway between each pair or gaps to form secondary shutters, as shown in dotted outline in FIG. 6. Each frame is projected twice, as first a primary shutter and then a secondary shutter cuts off the light passing through the aperture.

At high speeds of rotation, the periphery of the rotor is moving with a relatively high velocity so that when the loop begins to form in the gap, the trailing side of the gap strikes the loop and tends to break the film. Also, when the film is stopped suddenly on the pin 40 there is a tendency for the film perforations to tear and when the loop eventually expires it creates theoretically infinite tensile forces in the film. The film is usually passed through the projector many times before the film is discarded and therefore it is important that the film should not be broken or damaged.

Figure 1:
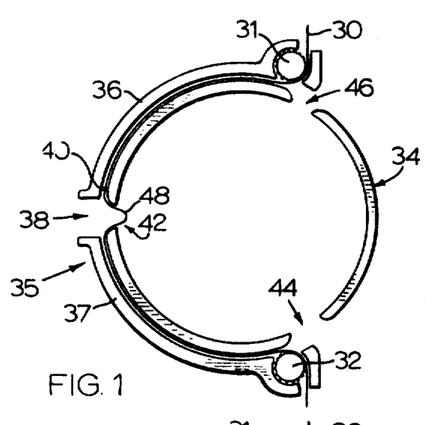
FIGS. 1 to 6 are diagrammatic plan views of a rolling loop mechanism drawn in sequence to illustrate the principle of operation of the mechanism.
Figure 2:
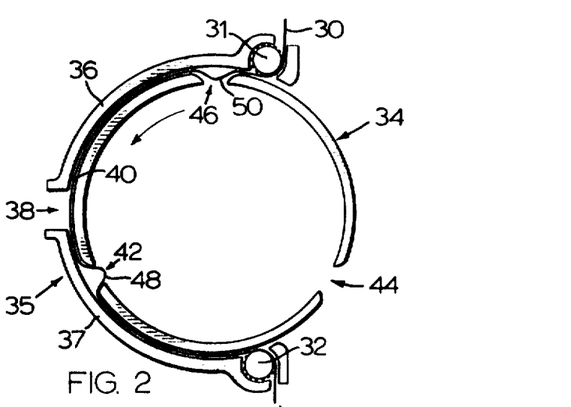
Figure 3:
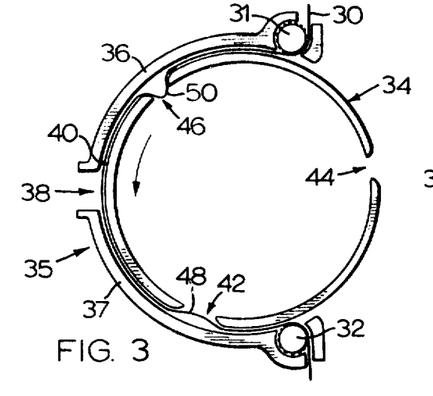
Figure 4:
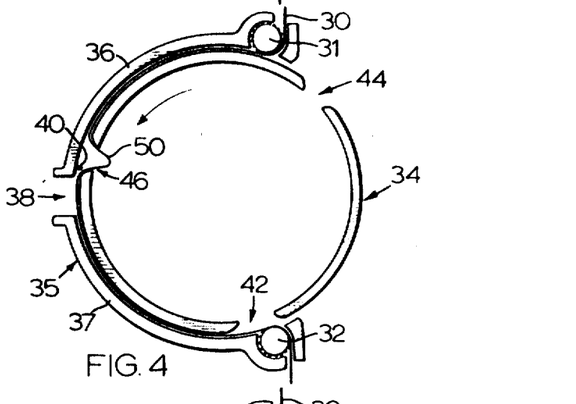
Figure 7:
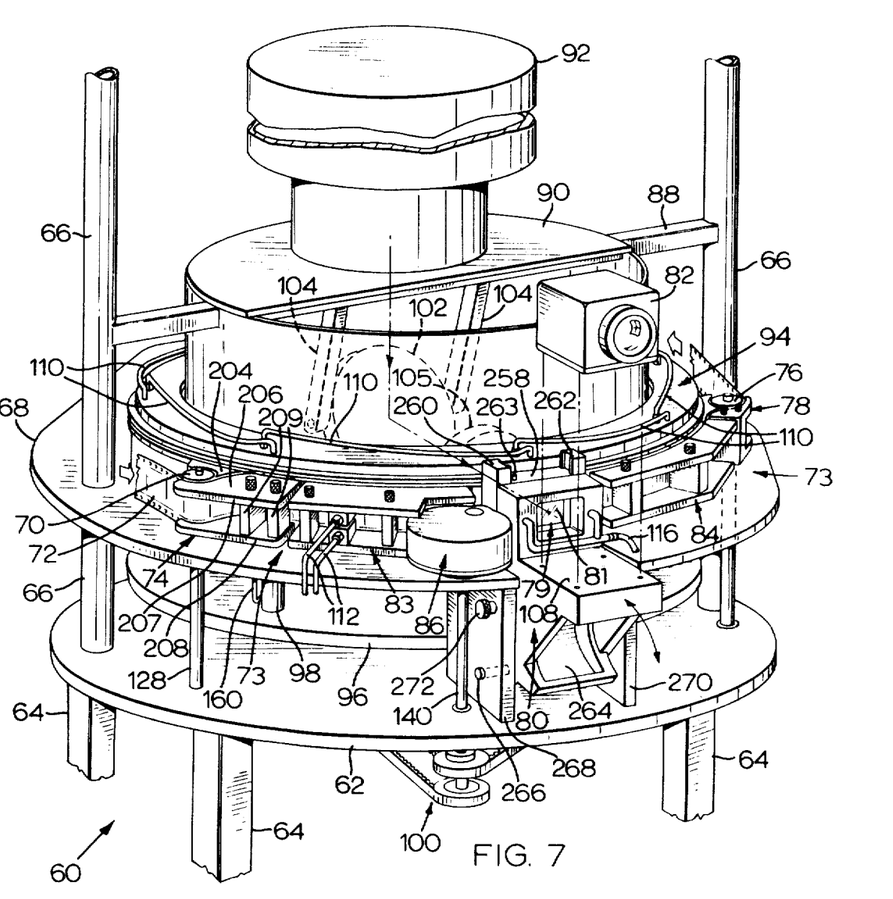
FIG. 7 is a perspective view of a motion picture projector which incorporates an improved rolling loop film transport mechanism according to the invention.

Reference is next made to Fig. 7 which sows a projector 60 incorporating a film transport mechanism which includes among other improvements; means for decelerating the film just before it is located on the stationary pins, and means for reducing the impact of the trailing side of the gap on the film loop. The projector 60 comprises a stationary base plate 62 supported on legs 64. The baseplate is rigidly attached by uprights 66 to a support plate 68 to which is coupled: a driven inlet sprocket 70 for feeding a film 72 into the projector; a stator 73 for guiding the film from the sprocket 70 to a driven outlet sprocket 76. The stator includes: an inlet guide 74, an inlet portion 83, an outlet portion 84 and an outlet guide 78. An aperture 79 and aperture structure 80 are located between the stator portions 83, 84 so that the structure 80 also forms a part of the stator. The structure 80 locates the film during exposure and also supports a lens 81 and lens system 82. A cam mechanism 86 is located adjacent the aperture structure 80 for decelerating the film 72 before the film strikes stationary pins such as 40 (FIG. 1).

The uprights 66 support a crossmember 88 to which is attached a cylindrical housing 90 which supports an upwardly extending lamp house 92. The lower portion of the housing 90 is surrounded by a rotor 94 which is supported on a circular carrier plate 96 by pillar 98. The carrier plate 96 together with the rotor 94, inlet sprocket 70 and outlet sprocket 76 are driven at constant speed by a belt drive system 100 (part of which is shown) which also drives the cam mechanism 86.

Light from the lamp house 92 strikes a mirror 102 which is adjustably suspended on arms 104 from the housing 90. The light then passes through a compound lens 105, through the film 72 and on through the lens 81 and lens system 82 which is adapted to be attached to an upper face 108 of the aperture structure 80. The lens system 82 is adjustable to focus the projector on screens at varying distances from the projector.

The projector is connected to a pressurized air or gas supply and to a vacuum source. The air supply is coupled to pipes 160 on the rotor 94 for cushioning the impact of the trailing side of a gap on the loop and to pipes 112 on the inlet portion 83 of the stator 73 to induce friction as the film moves past the stators and to stabilize the film, as will be described. The vacuum source is coupled to a pipe 116 which is attached to the structure 80 for drawing air from about the aperture 79 to locate the film during exposure, as will be described.

Figure 7A:
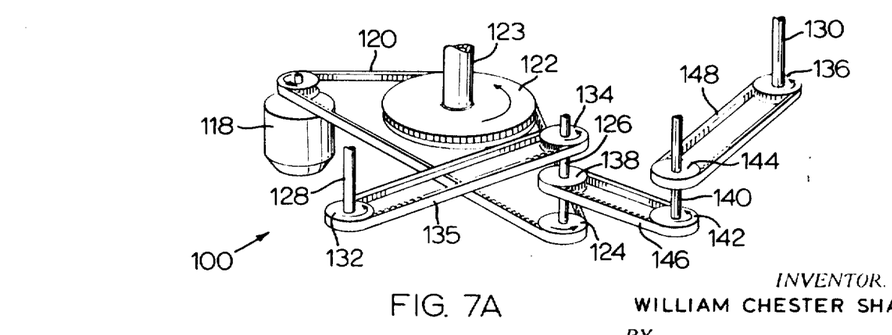
FIG. 7A is a perspective view of a drive train for the projector.

Reference is next made to FIG. 7A which shows the belt drive system 100 in greater detail. An electric motor 118 drives a toothed-belt 120 which passes around a rotor drive wheel 122 and a smaller wheel 124. The wheel 122 is fixed to a hollow shaft 123 which is coupled to the rotor 94, and the wheel 124 is attached to a layshaft 126 which in turn through wheels 138, 142 and toothed-belt 146 drives shaft 140 which is coupled to the cam mechanism 86 (FIG. 7). The cam mechanism 86 completes one cycle for every frame so that because the rotor has eight openings, the rotor drive wheel 122 rotates at one-eighth the speed of rotation of the cam mechanism wheel 142. The inlet sprocket 70 and outlet sprocket 76 are driven by shafts 128, 130 respectively. The shaft 128 is fixed to a wheel 132 which is driven by a wheel 134 on the shaft 126 through a toothed-belt 135, and the shaft 130 is fixed to a wheel 136 which is driven from a wheel 144 on shaft 140. The wheels associated with the drive to the sprockets 70, 76 are chosen so that each of the sprockets 70, 76 feeds one frame length of film 72 in the time it takes for one-eighth of a revolution of the eight gap rotor 94.

Figure 8:
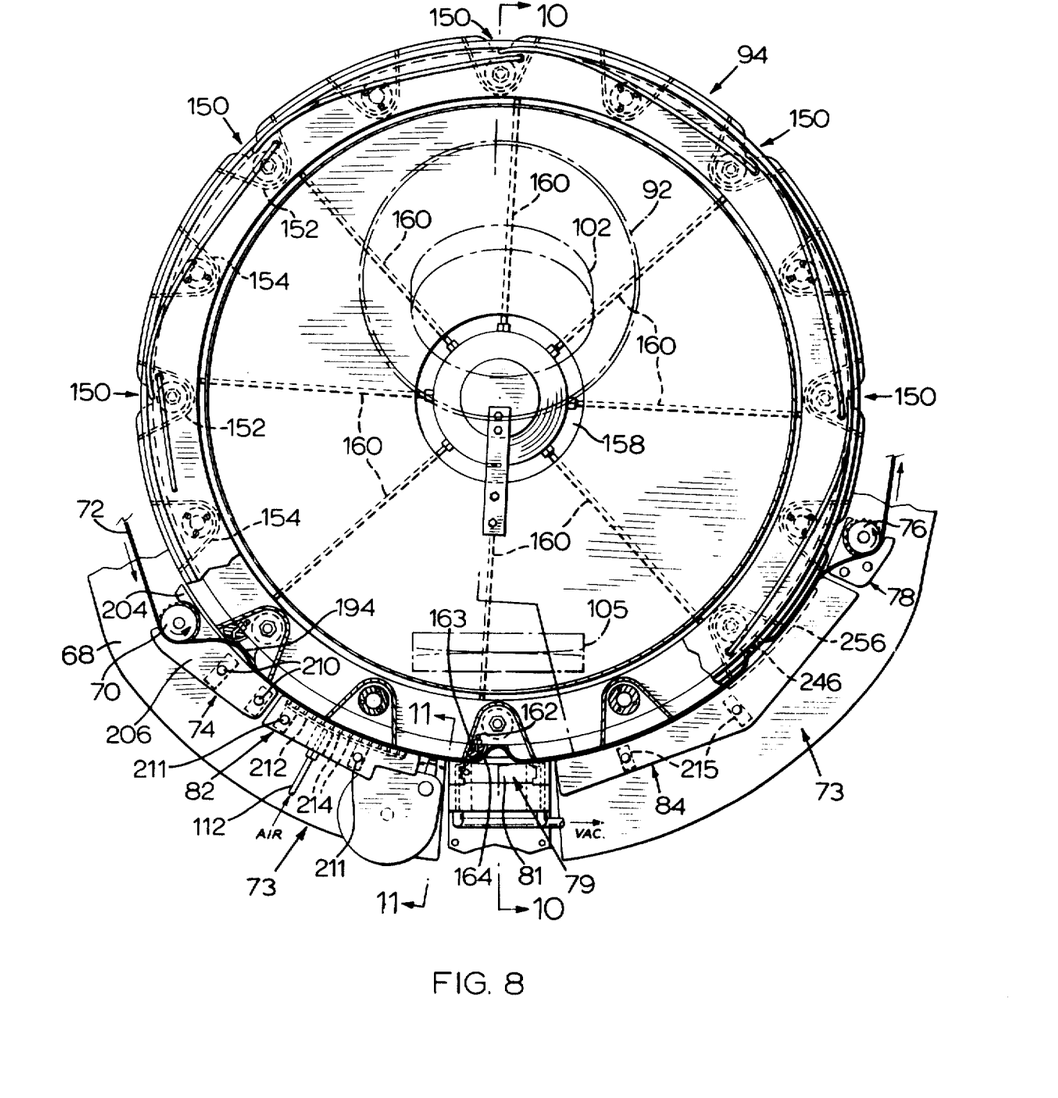
FIG. 8 is a partially sectioned plan view of the improved film transport mechanism.
Figure 9:
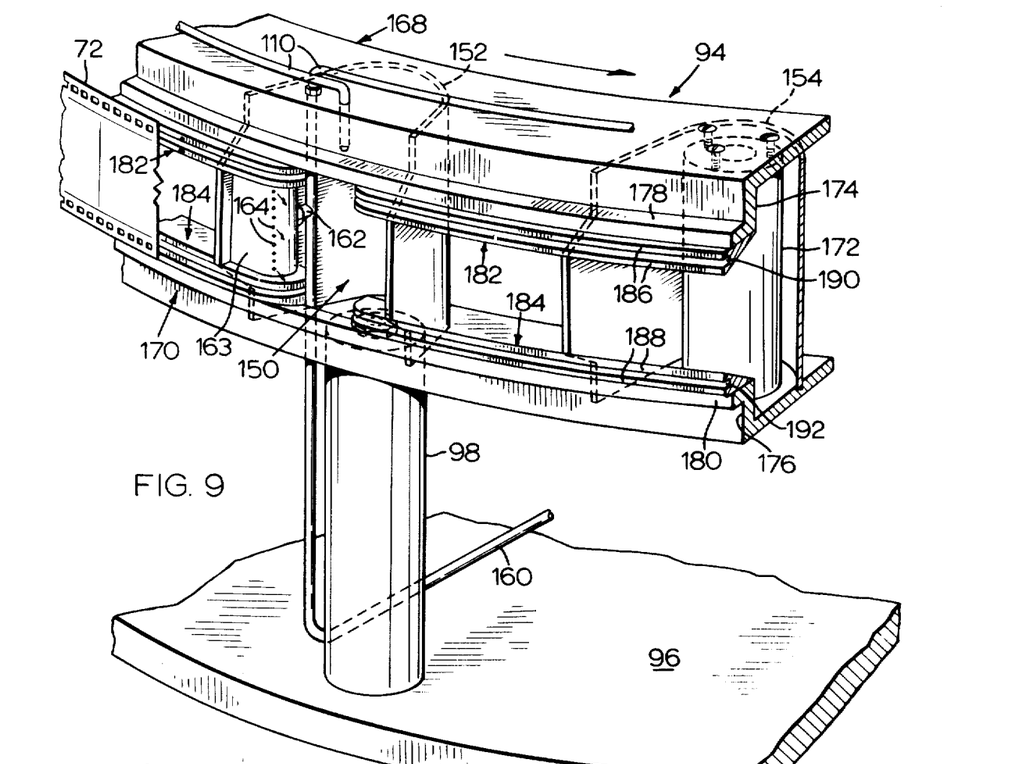
FIG. 9 is a perspective view of a portion of a rotor for the improved transport mechanism.

Reference is next made to FIGS. 8 and 9 to describe the rotor 94 and the rotor air system. The rotor 94 has eight identical gaps such as 150 and each gap 150 is covered on the inner side of the rotor by a curved primary shutter 152. Secondary shutters 154 which are the same size and shape as the shutters 152 are attached to the inside of the rotor with one of the shutters 154 midway between each pair of shutters 152. As the shutters 152, 154 pass the projection aperture 79 the light is cut off from the film 72. Projection takes place between shutters 152, 154 so that the film is projected twice between each pair of gaps 150. Compressed air is fed from beneath the projector through hollow shaft 123 (FIG. 10) to a combination rotary distributor and rotary valve 158. Radial pipes 160 connect the rotary distributor to each of the gaps 150 for supplying pressurized air to the gaps 150 and the flow of air is controlled by the rotary valve so that air flows through each pipe only when the corresponding gap is approaching and adjacent to the film inlet guide 74. Thus, as the trailing side of each gap approaches a newly formed loop adjacent the inlet guide 74, a pressurized pulse of air passes through the corresponding pipe 160 and into a short pipe 162 (FIG. 9) which distributes air to a manifold 163 feeding a row of vertical jets 164 for cushioning the impact of the trailing side of the gap on the film loop. The air blast which has a pressure preferably of the order of 50 to 65 pounds per square inch also tends to flatten the film, thereby eliminating longitudinal curves from the film to facilitate curving the film transversely to form a loop. The air is also distributed from the pipes 160 to corresponding pipes 110 each of which extends to the preceding gap. As seen in FIG. 8 a gap is opposite the inlet guide 74 and the preceding gap is opposite the projection aperture. At this time a pulse of air is passing through the corresponding pipe 160 to the gap and also to the preceding gap. The pipe 110 terminates in a nozzle which is directed towards the lens 81 for blowing dust or other particles from the lens.

As best seen in FIG. 9, the rotor 94 consists of upper and lower radially extending rings 168 and 170 respectively. The rings, which are spaced apart and coupled together by posts 172, have rigidifying vertical flanges 174, 176 respectively which terminate in short outwardly extending flanges 178, 180. The underside the upper flange 178 has eight curved shoes 182 equally spaced about its periphery and similar curved shoes 184 are attached in corresponding positions to the upper side of the lower flange 180. Each of the shoes 182, 184 has a wedge-shaped section for optical reason and extends outwardly beyond the corresponding flange 178, 180 terminating in outer faces 186, 188 respectively. Each of the faces 186, 188 has an inwardly extending radial groove 190, 192, the purpose of which will be explained later. When the film 72 is in contact with the curved shoes, the sprocket holes in the film are generally in line with the radial grooves 190, 192 respectively (as shown in FIG. 9) and the picture area of the film is located between the shoes 182, 184. Each of the shoes is curved at its ends and spaced from the next shoe to form sides of gaps 150, and the manifold 163 is supported between leading ends of shoes 182, 184 in such a position that it will not rub against the film.

Figures 10, 11:
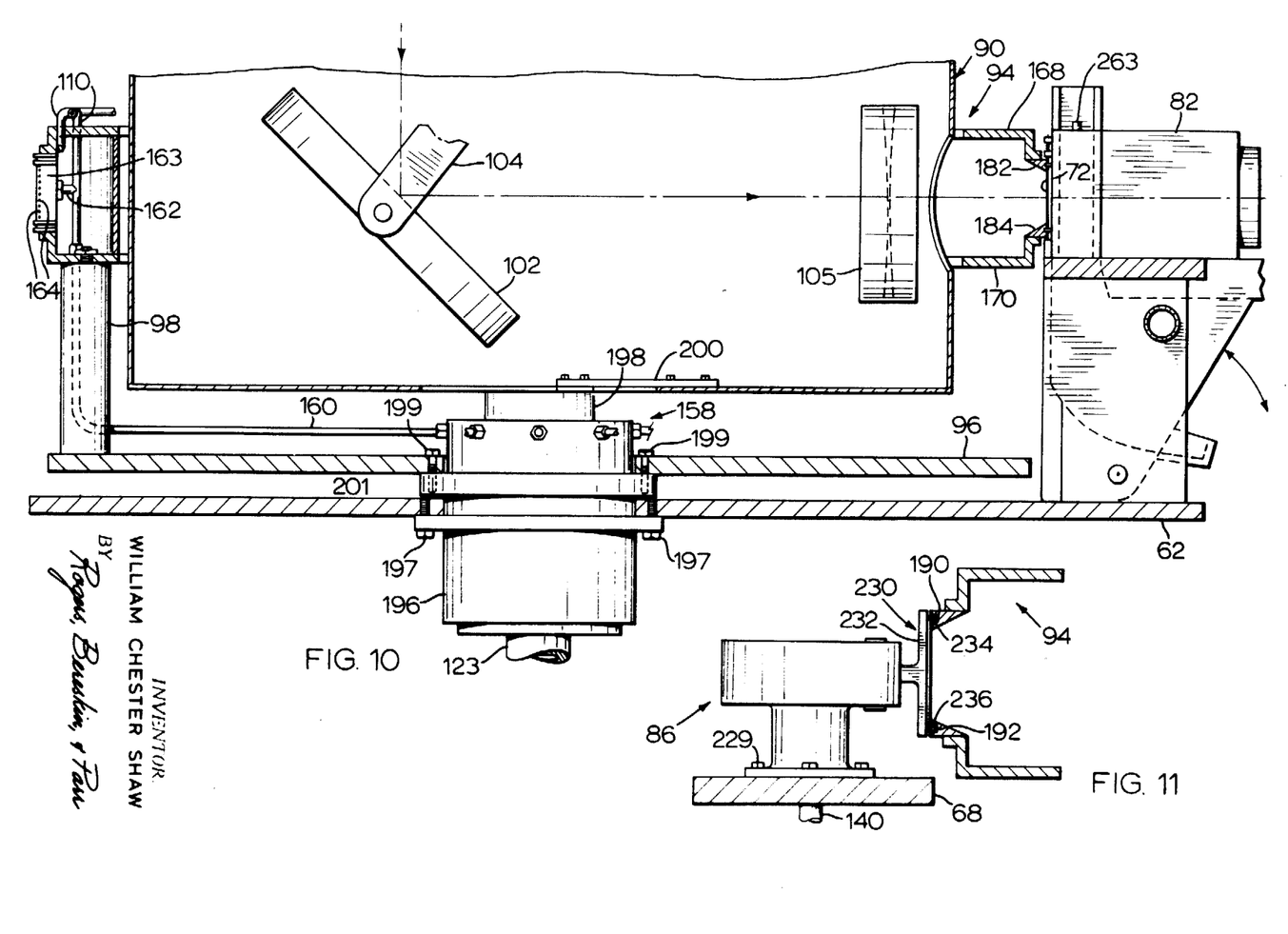
FIG. 10 is a partially sectioned side view taken generally on line 10—10 of FIG. 8.
FIG. 11 is a partially sectioned view taken generally on line 11—11 of FIG. 8.

Next, reference is made to FIG. 10 to describe the rotor mounting on the baseplate 62. The shaft 123 which is driven by the drive wheel 122 (FIG. 7A) is coupled to the rotor carrier plate 96 by a flange 201 and is supported in roller bearings (not shown) in a bearing housing 196. The bearing housing 196 is fixed to the stationary baseplate 62 by bolts 197 and the carrier plate 96 is attached by bolts 199 to the rotatable flange 201. The outer part of the rotary distributor 158 moves with the flange 201 and carrier plate 96 and the inner part 198 is fixed by a tie bar 200 to the stationary housing 90.

Reference is again made to FIG. 8 to further describe some of the stationary parts of the projector. The inlet guide 74 comprises a fixed portion 204 and a removable portion 206. The portions 204, 206 are shaped to partially enclose the driven inlet sprocket 70 and to guide the film 72 around the sprocket and towards the rotor 94 between the portions 204, 206. As seen in FIG. 7 the portion 206 consists of an upper plate 207 which is attached to a lower plate 208 by uprights 209. The plates 207, 208 are spaced apart so that the picture area of the film does not touch the portion 206. Returning to FIG. 8, the fixed portion 204 is constructed in a similar fashion. The portion 206 is held in place by two fitted bolts 210 which are threadably engaged in the support plate 68 so that the portion 206 can be removed for servicing if required. The opposing faces of the portions 204, 206 cooperate to define a path through which the film 72 passes. The film 72 should approach the rotor 92 at such an angle that a loop 194 results. If the film 72 approaches the rotor 94 tangentially, the film will tend to follow the rotor rather than form the loop 194, whereas if the film 72 approaches the rotor 94 radially, there will be a maximum impact between the rotor and the film loop 194. It is therefore preferable to feed the film 72 at an angle of between 30° and 45° from a tangent to ensure that a loop 94 will form while at the same time reducing the impact between the rotor 94 and the film 72.

The inlet portion 82 of the stator 73 is similar in construction to the inlet guide portion 206 and is also removably coupled to the support plate 68 by fitted bolts 211. The radial width of the path between the rotor 94 and the stator 73 is sufficient to allow the film 72 to move freely between the rotor 94 and the stator 73. However, when the film 72 is stationary adjacent the stator inlet portion 82 there is a tendency for the force created by the inlet feed sprocket 70 to produce undesirable effects in the film 72 which tend to introduce errors in the positioning of the film for projection. This is thought to be the result of variations in the radius of curvature of the portion of the film between the projection aperture 79 and the inlet guide 74 resulting in variation in the position of the film perforations in the region of the aperture 79. To overcome this problem and to reduce friction between the film and the stator, two rows of continuous air jets are played on the film, one row of jets adjacent each edge of the film. Air is fed from the pipes 112 to manifolds 212 in the upper and lower plates of the inlet portion 83. The manifolds 212 distribute the air to orifices 214 in the inwardly facing sides of the stator 82. The air impinges on the film and is deflected through 90° to escape along the face of the film. In escaping, the air forces the film off the stator 73 and it is thought that a combination of Coanda and Boundary layer effects locate the film in the path between the rotor and the stator to thereby stabilize the film. The air is preferably fed to the manifolds 212 at between 15 and 20 pounds per square inch.

The stabilized film is more readily located at the aperture because the length of film in the path between the inlet guide 74 and the aperture 79 is substantially constant.

The outlet portion 84 of the stator is similar in construction to the removable portion 206 of the inlet guide 74 and is removably attached to the support plate 68 by bolts 215. Also the outlet guide 78 is similar to the inlet guide 74.

Figure 12:
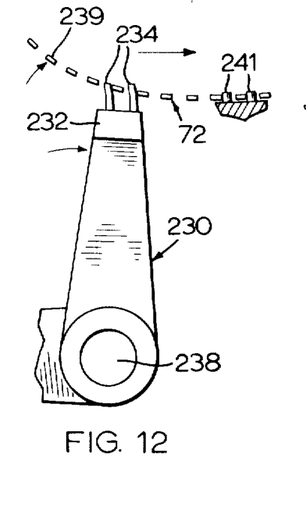
FIGS. 12 to 14 are sequence plan views of a portion of a decelerating mechanism for locating the film before projection.
Figure 13:
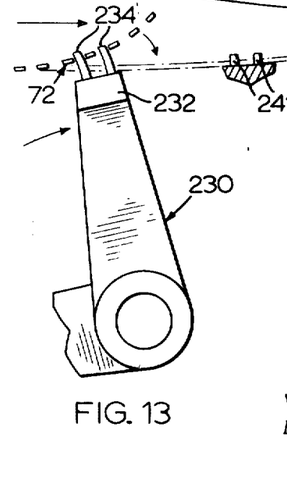
Figure 14:
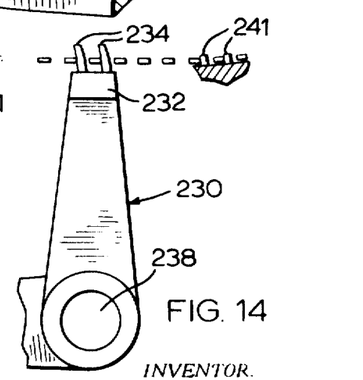

Reference is next made to FIG. 11 which shows the position of the cam mechanism 86 relative to the rotor 94. The mechanism is releasably attached to the support plate 68 by fitted bolts 229. A cranked arm 230 which extends outwardly towards the stator 94 is shaped to transmit movement from a cam wheel (described with reference to FIG. 15) to decelerating pins 234, 236. The arm 230 terminates at its outer end in a vertical cross bar 232 which carries the pins 234, 236 at its ends. The pins 234 engage in the perforations of the film and move in the slot 190 (FIG. 9) and the decelerating pins 236 move in the slot 192. The decelerating pins are disengaged from and engaged with the film 72 by the loop as it approaches and passes the pins. As seen in FIGS. 12 to 14, the film 72 is moved into and out of engagement with the decelerating pins as the loop approaches and passes the pins. In FIG. 12 the pins 234 (and hence the pins 236) are advancing about a pivot 238 in a direction with the movement of a loop 239 which is just about to reach the pins 234. The pins 234 which are preferably of polished hardened steel are shaped so that in their advanced position there is no interference between the pins 234 and the film perforations as the loop passes the pins thereby moving the film off the pins. As the loop 239 continues to move it lifts the film off the decelerating pins 234 and then off stationary pins 241 which are attached to the structure 80 adjacent the aperture 79 (FIG. 7). As soon as the film is free of the decelerating pins 234, the pins then retreat from the position shown in FIG. 12 into a position where they reverse their direction again to advance with the film into a position as shown in FIG. 13 where, due to their shape the pins again engage smoothly into the film 72. The loop passes the pins 234 and as the pins continue to move with the film, the cam mechanism decelerates the pins 234 until they almost stop at which point the loop moves over the stationary pins 241. The pins 234 then advance very slightly before stopping.

Figures 15, 21, 22:
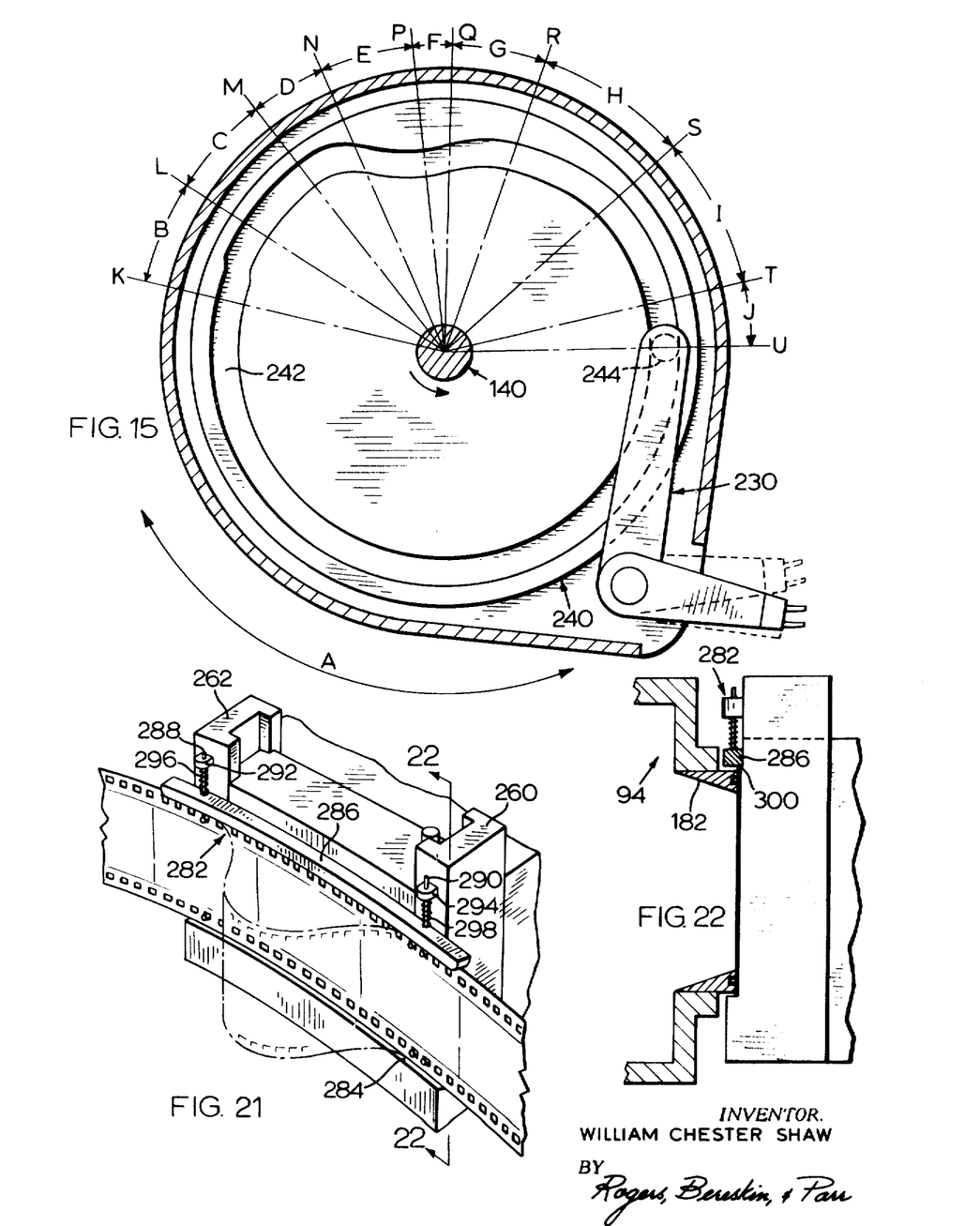
FIG. 15 is a plan view of a cam which forms part of the decelerating mechanism.
FIG. 21 is a perspective view showing a film location shoe.
FIG. 22 is a sectional view on line 22—22 of FIG. 21.

Reference is next made to FIG. 15 to more fully describe the cam mechanism 86. A cam wheel 240 is coupled to the drive shaft 140 which drives the cam 240 in an anticlockwise direction as drawn in FIG. 15. The cam 240 has a continuous cam groove 242 for guiding a cam follower 244 which is attached to the inner end of the cranked lever 230. The cam 240 rotates through 1 revolution once every frame movement and the cam groove 242 is marked off in the drawing into sectors A to J corresponding to movements of the decelerating pins 234 (and hence pins 236).

Figure 16:
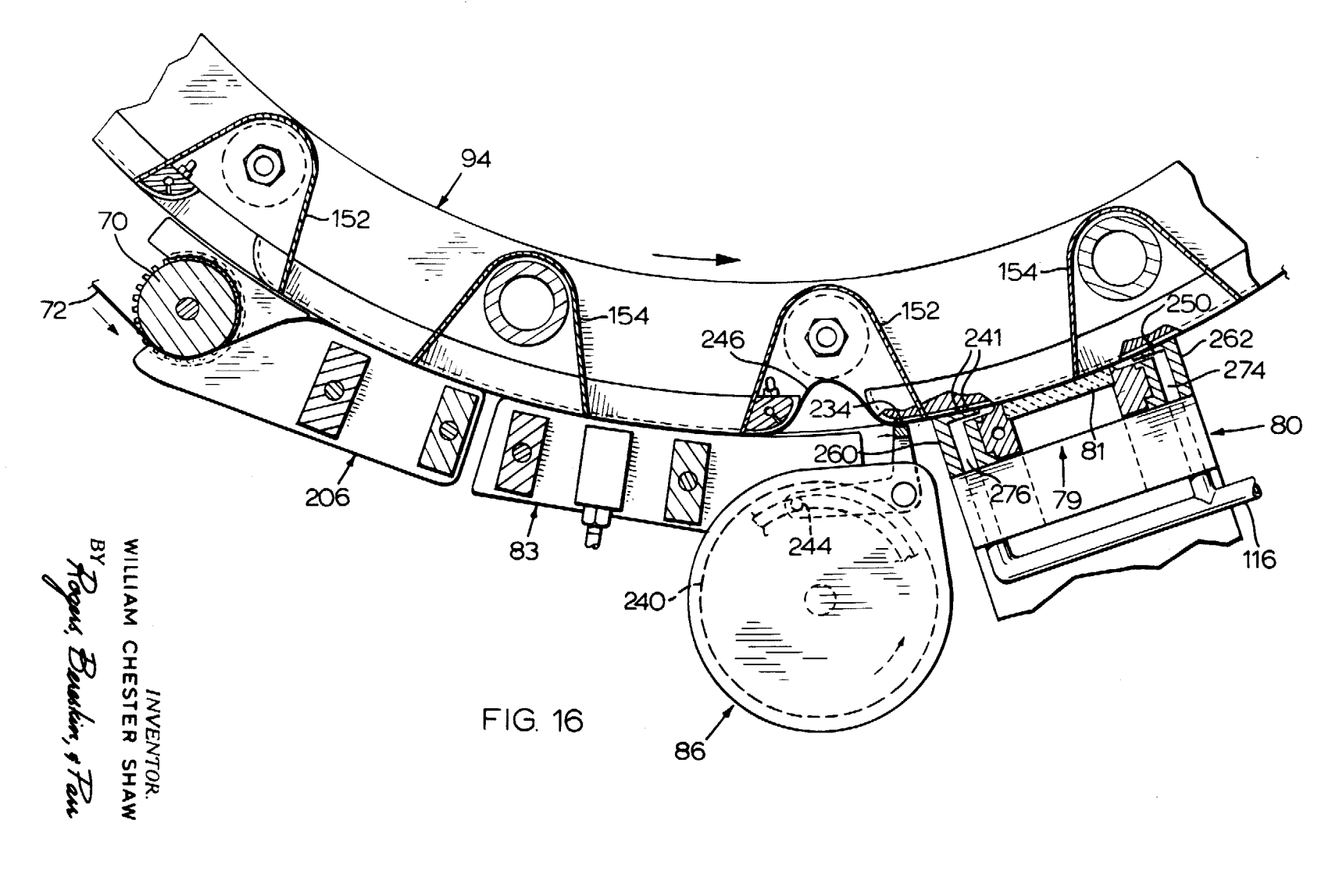
FIGS. 16 to 20 are sequence plan views of a portion of the improved film transport mechanism.
Figure 17:
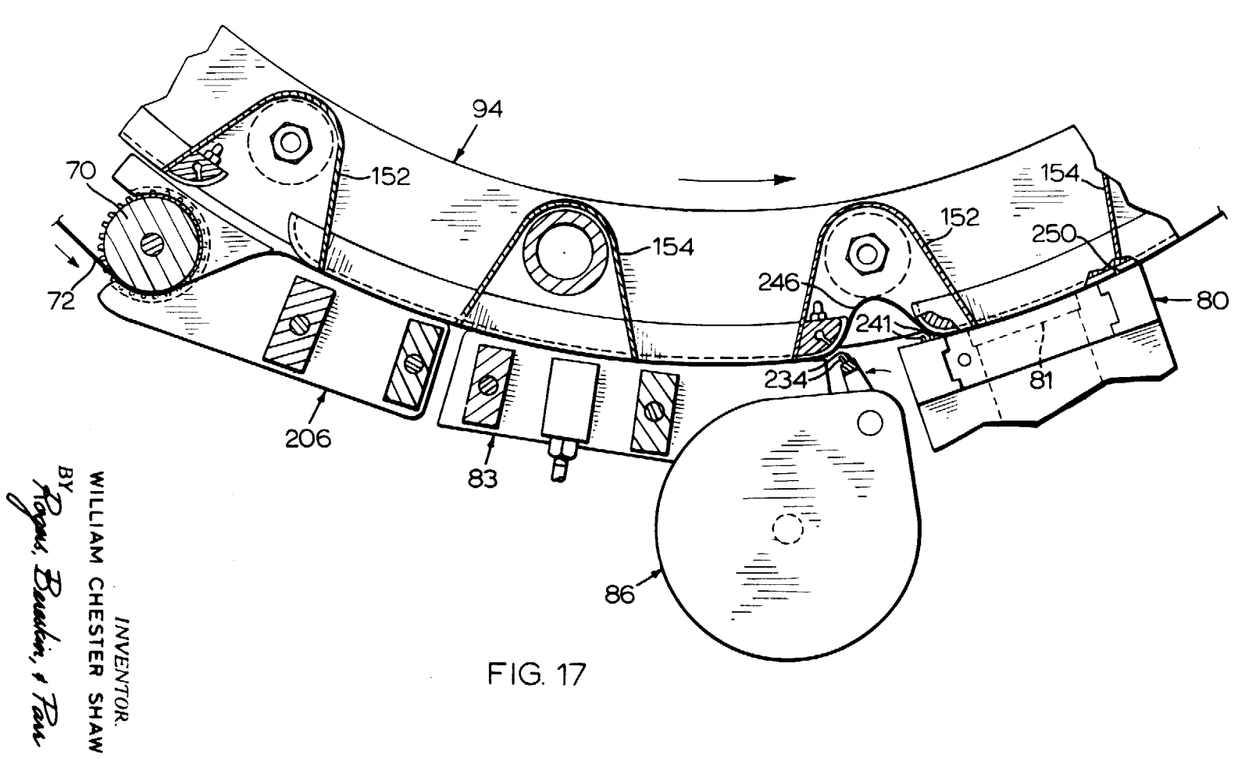
Figure 18:
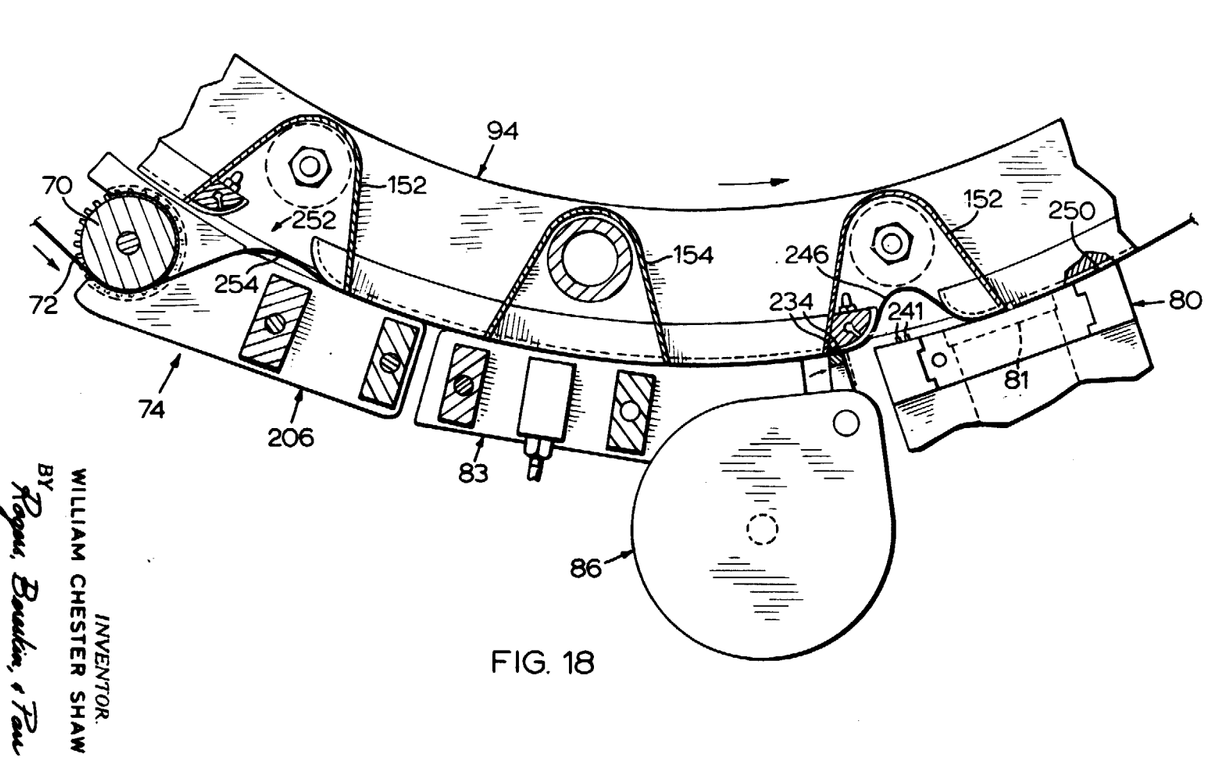
Figure 19:
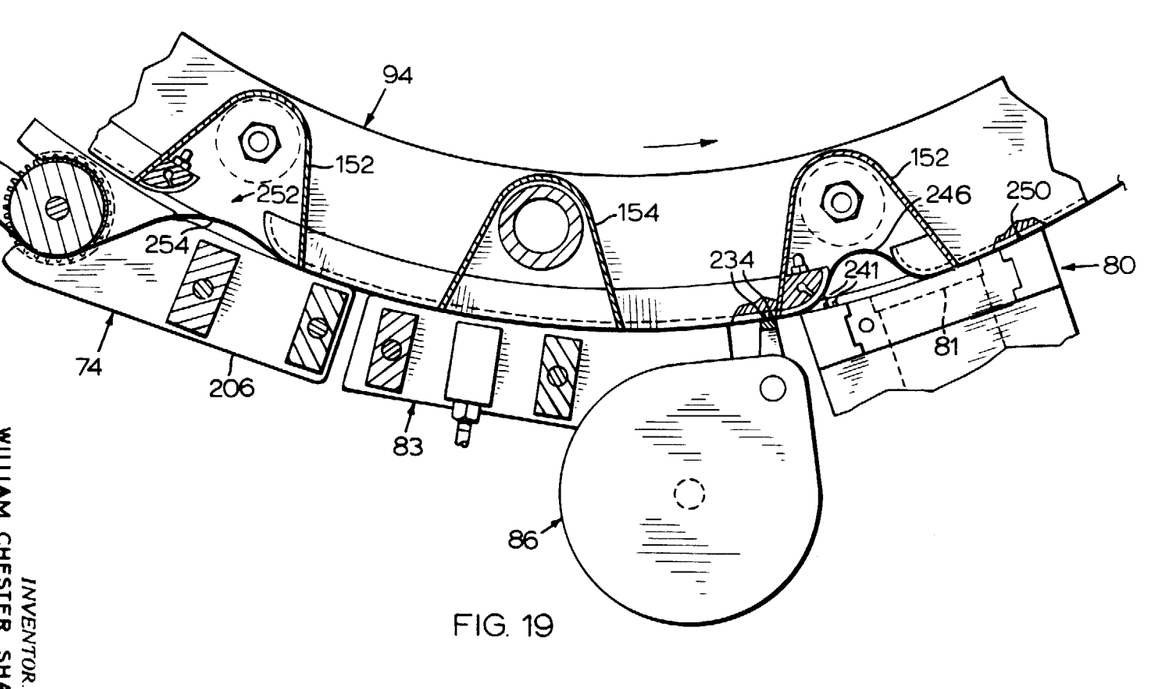
Figure 20:
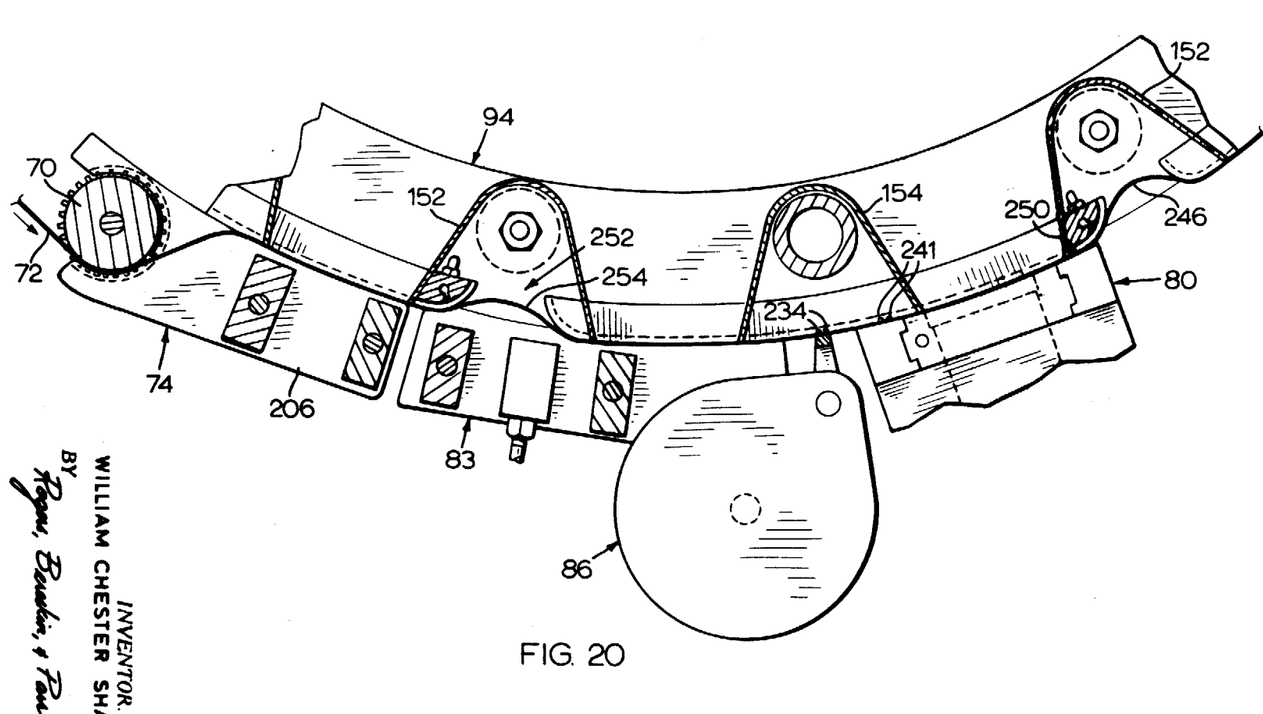

Reference is next made to FIGS. 15 to 20 to describe the formation of a loop. FIG. 16 shows the rotor 94 and cam mechanism 86 in a position where a loop 246 is approaching the decelerating pins 234. This position occurs as the point K in FIG. 15 reaches the cam follower 244. As the rotor 94 rotates, the cam 240 rotates and the portion B passes the cam follower 244 to accelerate the pins 234 to advance in the direction of motion of the rotor 94. The point L on the cam reaches the cam follower at which point the pins are decelerated to a stop. The film then lifts off the pins 234 as the loop 246 reaches the pins. During the portion C, the pins 234 are stationary and the leading part of the loop continues to advance toward the stationary pins 241. During the portion D, the pins 234 are accelerated away from the stationary pins 241 and then at the point N the pins begin to decelerate during the portion E until at the point P the FIG. 17 position is reached. The decelerating pins are then at the extremity of their travel away from the stationary pins 241. While the film is engaged on a fixed pin 250 located on the outlet side of the aperture 79, the inlet sprocket 70 continues to feed film into the projector so that the film is moving into the loop 246 until such time as the loop engages the pins 234. As the trailing side of the loop 246 approaches the decelerating pins, the portion F of the cam wheel 240 accelerates the pins 234 towards the stationary pins 241 until the decelerating pins 234 reach a velocity of approximately 70 percent of the film velocity, whereupon the trailing portion of the loop engages on the pins at about the point Q. The pins 234 are proportioned to enter the perforation without engaging the sides of the perforations. During the portion G, the pins 234 continue to move at a speed of 70 percent of the film speed. At the point R, which corresponds to FIG. 18, the trailing sides of the perforation have engaged the pins 234 and the film is moving at 70 percent of the speed at which the sprocket 70 is feeding film into the projector so that there must be a space to accommodate excess film. The space is provided as seen in FIG. 18 by positioning the inlet guide 74 such that the leading side of the succeeding gap 252 has just passed the inlet path of the film 72. Thus, as film is decelerating a new loop 54 begins to form in the succeeding gap 252 and the trailing edges of the film perforations are engaged against the decelerating pins 234, as shown in FIG. 18. The pins 234 decelerated through the FIG. 19 position during the portion H until at point S the pins have almost stopped. At this time the rotor is in a position where the loop 246 has laid film on the stationary pins 241 and the decelerating pins 234 have advanced relative to the film by about 0.003 inches. Consequently the decelerating pins 234 are no longer in contact with the film. The pins 234 are then accelerated during the portion J so that they come to rest engaged in the film perforations but not in contact with the film. As seen in FIGS. 19 and 20 the loop 254 continues to grow as the film is decelerated and the loop 246 lays film on the stationary pins 241 and then on the pins 250. In the FIG. 20 position, the film has been laid on the stationary pins, the loop 246 has passed the projecting aperture and the decelerating pins 234 are stationary. This corresponds to a point in the portion A during which the pins 234 are located in a dwell position.

Reference is again made to FIG. 8. The loop 246 continues to decay as it approaches the film outlet guide 76 until it finally expires in the area of a curved plate 256 which is supported between the upper and lower plates of the outlet portion 84 of the stator 73. As the loop 246 expires it squeezes air from between itself and the plate 256 so that the air acts as a cushion to dampen the sudden collapse of the loop to reduce the theoretically infinite tensile forces in the film which would be caused by a sudden collapse. The film 72 is then drawn out of the projector by the outlet sprocket 76.

For optical reasons, the film is located against the lens 81 projection or exposure. Also it is advantageous to have the lens arranged so that it can be replaced by a clean lens when required. Reference is again made to FIG. 7 to describe the aperture structure 80 more fully. The structure 80 includes a vacuum system connected by the vacuum pipe 116 to a relatively high volume, low pressure, vacuum source (not shown) and a lens holder 258 which contains the lens 81. The lens holder 258 is slidably engaged in opposed vertical runners 260, 262, and located in the runners by a latch (not shown). A button 263 in the top of the lens holder 258 is coupled to the latch so that when the button is depressed, the holder slides in the runners 260, 262 and is collected in the opening 264 at the bottom of the structure 80. The button is arranged so that if a clean lens holder is entered into the runners 260, 262, the underside of the holder depresses the button to activate the latch. As soon as the clean lens holder is in position the latch locks the clean holder in place in the runners 260, 262.

The structure 80 is pivotally connected at 266 between two upright plates 268, 270 which are fixed at their ends to the baseplate 62 and to the support plate 68. The structure 80 is located by a spring-loaded fitted pin 272 which is housed in the plate 268 for engaging in a hole (not shown) in the structure 86.

As best seen in FIG. 16, the vacuum pipe 116 is connected to vacuum manifold tubes 274, 276 in the runners 260, 262 respectively. The tubes terminate in vertical recesses 278, 280 formed between the lens holder 258, the runners 260, 262, and the film 72. The film is consequently located radially relative to the rotor 94 by the vacuum system, and circumferentially by the stationary pins 241, 250 (FIG. 16). The film is preferably located vertically by a shoe assembly 282 shown in FIGS. 21 and 22. The film 72 rests on an inwardly projecting ledge 284 below the aperture 79 (FIG. 21) which extends around the stator 73. The top edge of the film supports a show 286 which has a pair of rods 288, 290 slidably engaged in lugs 292, 294 on the rear faces of the runners 260, 262. The shoe 286 is biassed downwardly by light coil springs 296, 298 engaged between the shoe 286 and the lugs 292, 294. The shoe is sufficiently lengthy to allow a loop to pass under the shoe without losing contact between the film and the shoe. As seen in FIG. 22 the film extends upwardly above the curved shoe 182 on the rotor 94. However if the film breaks or the machine is run without a film the shoe 286 rests on a step 300 on the runners to prevent the shoe 286 from engaging on the rotor 94.

The size of the gap depends upon a number of factors. For a given rotor and a given frequency of projection, the time taken for a shutter to pass the aperture is proportional to the circumferential extent of the shutter, i.e. the smaller the extent of the shutter the less time the film is not being projected. Also it is desirable to have small gaps and hence small shutters to project the film for longer periods to reduce the intensity of illumination required to project the film.

Longer projection times can also be achieved for a given loop and shutter size by increasing the diameter of the rotor. The angular velocity is fixed by the frequency of projection and the number of gaps in the rotor. In the case of the projector shown in the drawings, for a projection frequency of 48 projections per second the mechanism must transport 24 frames per second. There are eight gaps in the rotor so that the rotor must make 3 revolutions per second, irrespective of the diameter of the rotor. The rotor is preferably made small to reduce the inertia of the rotor although a large rotor has the optical advantage that the film is more nearly flat at the projection aperture.

The transport mechanism can be used for any device which requires the intermittent movement of film past a point or aperture. In a camera the rotor would have no secondary shutters between the gaps and the primary shutters would be designed so that the distance between them would give the required exposure time. Alternatively a separate adjustable shutter coordinated to the position of the gaps could be provided.

In some cases where smaller illumination systems are sued, the bulb could be located inside the rotor in the position occupied by the mirror 202 (FIG. 7).

What I claim as my invention is:

1. A film transport mechanism for a motion picture machine in which a film is intermittently transported through a predetermined frame length in relation to an aperture, said film transport mechanism comprising: a stator, a rotor cooperating with said stator to define a passage for said film, said rotor having gaps for receiving film loops; an inlet in said stator through which said film is fed into said passage; an outlet in said stator through which said film is withdrawn from aid passage, said aperture being intermediate said inlet and said outlet; film moving means for feeding said film into said inlet at a controlled speed relative to the speed of said rotor and for withdrawal for said film from said outlet at said controlled speed; film locating means for cooperating with said film moving means for gradually increasing and then gradually decreasing said film loop in said gap and for intermittently holding said film in fixed position in registration with said aperture; and decelerating means coupled to said stator and operable to decelerate said film to thereby reduce impact between said film and said locating means as said film engages said locating means.

2. A film transport mechanism as claimed in claim 1 wherein said decelerating means is adjacent said aperture and wherein said decelerating means comprises: film engagement means for releasably engaging a film to decelerate said film and including cam follower means; cam means cooperating with said cam follower means for controlling the position of said engagement means; and drive means coupled to said rotor for driving said cam means through a cycle of movements, said cam means being in a predetermined position relative to said stator as each of said gaps reaches said aperture.

3. A film transport mechanism as claimed in claim 2 wherein said engagement means comprises; a cam follower, said cam follower being pivotally coupled to a stationary portion of said decelerating means; decelerating pins fixed to the distal end of said follower for engaging in perforations in said film, said pins being shaped to substantially eliminate interference between said film and said pins when said film engages and disengages said pins as a said loop is transported past said pins by a said rotor gap.

4. A film transport mechanism as claimed in claim 3 wherein said cam means comprises a cam wheel having a profiled groove for cooperating with said cam follower to move said decelerating pins through said cycle, said cycle comprising; advancing said pins to a position where said pins are freely engaged in perforations in said film, said pins then remaining stationary as said loop approaches and lifts said film off said pins; said pins are then moved toward the trailing side of said loop before their direction is reversed to move the pins in the locations of motion of said film, whereupon said film engages on said pins and said pins are decelerated thereby reducing the velocity of said film to reduce the impact of said film on said film locating means.

5. A film transport mechanism as claimed in claim 1 which further comprises: cushioning means coupled to said rotor and operable to reduce the impact between a growing loop and a trailing side of said gap as said rotor picks up said growing loop in said gap.

6. A film transport mechanism as claimed in claim 5 which further includes film stabilizing means, said film stabilizing means comprising: a pressurized gas supply; means distributing said supply to said stator intermediate said inlet and said aperture; gas jet means fixed to said stator and operably coupled to said distribution means, said gas jet means extending substantially between said inlet and said aperture for directing said gas against said film to thereby stabilize said film in said passage.

7. A film transport mechanism as claimed in claim 1 which further includes film stabilizing means, said film stabilizing means comprising: a pressurized gas supply; means distributing said supply to said stator intermediate said inlet and said aperture; gas jet means fixed to stator and operably coupled to said distribution means, said gas jet means extending substantially between said inlet and said aperture for directing said gas against said film to thereby stabilize said film in said passage.

8. A film transport mechanism as claimed in claim 7 wherein said film transport mechanism further comprises: a light source adapted to project light through said film in registration with said aperture; primary and secondary shutters fixed to said rotor for interrupting said projected light, each of said primary shutters bridging a said gap and each said secondary shutters being located midway between adjacent primary shutters to interrupt projection, each of said shutters having a predetermined circumferential extent about the periphery of said rotor; a plat fixed to said stator, said plate having a curved face forming a portion of the outer side of said film passage, said plate being positioned adjacent said outlet for cushioning the final collapse of said loop by controlling the direction of flow of air displaced by said loop; and wherein said rotor moves about generally vertical axis and said stator rotor further comprises a horizontal inwardly extending ledge, said film moving with the lower edge of said film on said ledge; and wherein said mechanism further comprises pressure means adapted to apply a downward force on the upper edge of said film to locate said film lower edge against said ledge.

9. A film transport mechanism for a motion picture machine in which a film is intermittently transported through a predetermined frame length in relation to an aperture, said film transport mechanism comprising: a stator; a rotor cooperating with said stator to define a passage for said film, said rotor having gaps for receiving film loops; an inlet in said stator through which said film is fed into said passage; an outlet in said stator through which said film is withdrawn from said passage said aperture being intermediate said inlet and said outlet; film moving means for feeding said film into said inlet at a controlled speed relative to the speed of said rotor and for withdrawal of said film from said outlet at said controlled speed; film locating means for cooperating with said film moving means for gradually increasing and then gradually decreasing said film loop in said gap and for intermittently holding said film in fixed position in registration with said aperture; and cushioning means coupled to said rotor and operable to reduce the impact between a growing loop and the trailing side of said gap as said rotor picks up said growing loop in said gap.

10. A film transport mechanism as claimed in claim 9 wherein said cushioning means comprises: supply means coupled to said stator for selectively distributing a pressurized gas to said gaps so that each gap receives a pulse of gas as said gap receives a newly formed loop; and gas jet means directing said pressurized gas towards said loop to thereby cushion the impact of said trailing side of said gap on said loop.

11. A film transport mechanism as claimed in claim 10 wherein said supply means comprises: a fixed inlet pipe connected to a pressurized gas supply; a rotary union coupled to said inlet pipe and to said rotor; distribution pipes attached to said rotor and to said rotary union for distributing gas from said union to said gas jet means; and a valve coupled to said rotary union for supplying said gas to each of said distribution pipes in sequence.

12. A film transport mechanism as claimed in claim 11 wherein said supply means further comprises a plurality of secondary pipes for supplying said pressurized gas to said aperture to blow dust and the like off an aperture lens; each of said secondary pipes being coupled to s distribution pipe adjacent a said gap and extending forwardly about said rotor to a preceding gap for directing a proportion of said pulse of gas into said preceding gap to clean said lens.

13. A film transport mechanism as claimed in claim 9 which further includes film stabilizing means, said film stabilizing means comprising: a pressurized gas supply; means distributing said supply to said stator intermediate said inlet and said aperture; gas jet means fixed to stator and operably coupled to said distribution means, said gas jet means extending substantially between said inlet and said aperture for directing said gas against said film to thereby stabilize said film in said passage.

14. A film transport mechanism for a motion picture projector, said mechanism comprising:
 a. a generally cylindrical rotor having a plurality of gaps spaced equally about its periphery for receiving a film loop,
 b. a stator cooperating with said rotor to define a passage for guiding said film, said stator having an aperture for projecting said film,
 c. a film inlet at an inlet end of said passage for guiding film into said passageway, said film inlet being positioned at a predetermined circumferential distance from said aperture, said predetermined distance being substantially equal to the circumferential distance between adjacent gaps in said rotor,
 d. a film outlet end of said passage, the circumferential distance between said outlet and said aperture being substantially greater than said predetermined circumferential distance,
 e. means for moving said film through said passage from said inlet to said outlet in the direction of rotation of said rotor so that the time interval between successive gaps passing said aperture is substantially equal to the time taken by said film moving means to feed a film frame length into said passage;
 f. film locating means for cooperating with said film moving means for gradually increasing and then gradually decreasing said film loop in a said gap when a said gap is opposite said stator and for intermittently holding said film in fixed position in register with said aperture;
 g. a light source adapted to project light through said film in registration with said aperture;
 h. primary and secondary shutters fixed to said rotor for interrupting said projected light, each of said primary shutters bridging a said gap and each said secondary shutter being located midway between adjacent primary shutters to interrupt projection, each of said shutters having a predetermined circumferential extent about the periphery of said rotor,
 i. and a plate fixed to said stator, said plate having a curved face forming a portion of the outer side of said film passage, said plate being positioned adjacent said outlet for cushioning the final collapse of said loop by controlling the direction of flow of air displaced by said loop.

15. A film transport mechanism as claimed in claim 14 wherein said rotor moves about a generally vertical axis and said rotor further comprises a horizontal inwardly extending ledge, said film moving with the lower edge of said film on said ledge; and wherein said mechanism further comprises pressure means adapted to apply a downward force on the upper edge of said film to locate said film lower edge against said ledge.

16. A film transport mechanism as claimed in claim 14 which further comprises: a decelerating means coupled to said stator and operable to decelerate said film to thereby reduce impact between said film and said locating means as said film engages said locating means.

17. A film transport mechanism as claimed in claim 16 which further includes: cushioning means coupled to said rotor and operable to reduce the impact between a growing loop and the trailing side of said gap as said rotor picks up said growing loop in said gap.

18. A film transport mechanism as claimed in claim 17 which further includes film stabilizing means, said film stabilizing means comprising: a pressurized gas supply; means distributing said supply to said stator intermediate said inlet and said aperture; gas jet means fixed to stator and operably coupled to said distribution means, said gas jet means extending substantially between said inlet and said aperture for directing said gas against said film to thereby stabilize said film in said passage.

19. A film transport mechanism as claimed in claim 14 which further includes: cushioning means coupled to said rotor and operable to reduce the impact between a growing loop and the trailing side of said gap as said rotor picks up said growing loop in said gap.

20. A film transport mechanism as claimed in claim 14 which further includes film stabilizing means, said film stabilizing means comprising: a pressurized gas supply; means distributing said supply to said stator intermediate said inlet and said aperture; gas jet means fixed to stator and operably coupled to said distribution means, said gas jet means extending substantially between said inlet and said aperture for directing said gas against said film to thereby stabilize said film in said passage.

21. A film transport mechanism as claimed in claim 14 wherein said film locating means comprises at least one stationary pin fixed to said stator adjacent said aperture, said pin being adapted for engaging film perforations to locate said frame at said aperture.

22. A film transport mechanism as claimed in claim 21 wherein said rotor moves about a generally vertical axis and said rotor further comprises a horizontal inwardly extending ledge, said film moving with the lower edge of said film on said ledge; and wherein said mechanism further comprises pressure means adapted to apply a downward force on the upper edge of said film to locate said film lower edge against said ledge.

23. A film transport mechanism as claimed in claim 22 wherein said film locating means further comprises vacuum means coupled to said stator about said aperture for drawing said film into engagement with the periphery of said aperture.

24. A film transport mechanism as claimed in claim 23 wherein said rotor has eight said gaps and said film moving means includes an inlet sprocket for feeding said film into said inlet and an outlet sprocket for drawing said film from said outlet, said sprockets being adapted to move eight frame lengths of film for each revolution of said rotor.

25. A film transport mechanism for a motion picture projector, said mechanism comprising:
   a. a generally cylindrical rotor having a plurality of gaps spaced equally about its periphery for receiving a film loop,
   b. a stator cooperating with said rotor to define a passage for guiding said film, said stator having an aperture for projecting said film,
   c. a film inlet at an inlet end of said passage for guiding film into said passageway, said film inlet being positioned at a predetermined circumferential distance from said aperture, said predetermined distance being substantially equal to the circumferential distance between adjacent gaps in said rotor,
   d. a film outlet at an outlet end of said passage, the circumferential distance between said outlet and said aperture being substantially greater than said predetermined circumferential distance,
   e. means for moving said film through said passage from said inlet to said outlet in the direction of rotation of said rotor so that the time interval between successive gaps passing said aperture is substantially equal to the time taken by said film moving means to feed a film frame length into said passage;
   f. film locating means for cooperating with said film moving means for gradually increasing and then gradually decreasing said film loop in a said gap when a said gap is opposite said stator and for intermittently holding sad film in fixed position in register with said aperture;
   g. a light source adapted to project light through said film in registration with said aperture;
   h. primary and secondary shutters fixed to said rotor for interrupting said projected light, each of said primary shutters bridging a said gap and each said secondary shutters being located midway between adjacent primary shutters to interrupt projection, each of said shutters having a predetermined circumferential extent about the periphery of said rotor,
   i. and film stabilizing means, said film stabilizing means comprising: a pressurized gas supply; means distributing said supply to said stator intermediate said inlet and said aperture; gas jet means fixed to stator and operably coupled to said distribution means, said gas jet means extending substantially between said inlet and said aperture for directing said gas against said film to thereby stabilize said film in said passage.